United States Patent [19]
Nance

[11] Patent Number: 5,214,586
[45] Date of Patent: May 25, 1993

[54] AIRCRAFT WEIGHT AND CENTER OF GRAVITY INDICATOR

[76] Inventor: C. Kirk Nance, P.O. Box 120605, Arlington, Tex. 76012

[21] Appl. No.: 832,470

[22] Filed: Feb. 7, 1992

[51] Int. Cl.$^5$ .............................................. G01L 19/04
[52] U.S. Cl. .................................... 364/463; 364/567; 364/571.03; 364/428; 73/178 T
[58] Field of Search .................... 364/463, 571.03, 427, 364/428, 557, 558, 567; 73/178 T, 4 R

[56] References Cited

U.S. PATENT DOCUMENTS

| | | | |
|---|---|---|---|
| 3,513,300 | 5/1970 | Elfenbein | 235/150.2 |
| 3,584,503 | 6/1971 | Senour | 73/65 |
| 3,701,279 | 10/1972 | Harris et al. | 73/65 |
| 3,900,828 | 8/1975 | Lage et al. | 340/27 |
| 4,110,605 | 8/1978 | Miller | 364/463 |
| 4,225,926 | 9/1980 | Wendt | 364/463 |
| 4,446,524 | 5/1984 | Wendt | 364/463 |
| 4,490,802 | 12/1984 | Miller | 364/567 |
| 4,502,555 | 3/1985 | Gower | 177/25 |
| 4,607,530 | 8/1986 | Chow | 73/708 |
| 4,651,292 | 3/1987 | Jeenicke et al. | 364/571.03 |
| 4,715,003 | 12/1987 | Keller et al. | 364/571.03 |
| 4,796,212 | 1/1989 | Kitagawa | 364/571.03 |
| 4,866,640 | 9/1989 | Morrison, Jr. | 364/558 |
| 4,935,885 | 6/1990 | McHale et al. | 364/567 |

OTHER PUBLICATIONS

"Omega Pressure and Strain Measurement Handbook and Encyclopedia," pp. A-9-A-10, 1985.

*Primary Examiner*—Thomas G. Black
*Attorney, Agent, or Firm*—Geoffrey A. Mantooth

[57] ABSTRACT

An onboard system for use in measuring, computing and displaying the gross weight and location/relocation of the center of gravity, for aircraft. Temperature and pressure transmitters and transducers of the more accurate quartz and digital signal type are mounted in relation to each of the landing gear struts. Transmit those digital temperature and pressure signals to an onboard microcomputer/controller with redundancy for accuracy and failure protection. The system also incorporates a software correction program to correct and compensate for physical changes to strut components due to temperature fluctuations, O-ring seal drag and hysteresis within modern day "shock absorbing" aircraft landing gear struts. The computer makes adjustments for internal temperature changes and drag; converts sustained pressures to the weight supported by each strut, and computes the aircraft's current gross weight and center of gravity. The computer also is pre-programmed to illuminate a "Hard Landing Indicator Light" mounted on the display, when pre-programmed individual strut pressure limits are exceeded and sensed during landing. These pressure readings are stored in the computer memory and can be utilized when the aircraft is inspected and serviced.

13 Claims, 6 Drawing Sheets

AIRCRAFT WEIGHT AND CENTER OF GRAVITY INDICATOR

BACKGROUND OF THE INVENTION

Two critical factors in the flight of any aircraft or airplane are the weight and balance of that aircraft or airplane. Federal Aviation Administration regulations #FAR 23 & 25 of Title 14, Code of Federal Regulations, require an airplane manufacturer to determine and publish the maximum gross operating weight of an airplane. This is to insure that at take-off speed, the wings are generating sufficient lift to lift the weight of the airplane. A second but equally important factor to consider is whether the airplane is in balance (optimum location for the center of gravity) or within acceptable limits, as can be compensated for by trim adjustments.

Calculations to determine gross weight and center of gravity in terms of percent MAC (Mean Aerodynamic Chord) are well known and well documented. Reference may be made to U.S. Pat. No. 3,513,300 to Elfenbein. Prior art methods to determine gross weight and center of gravity are performed using measurements of some portions of the aircraft's payload and estimates of the remaining portions of the aircraft's payload. This information is input into ground computers which calculate gross weight and center of gravity. The calculations are relayed to the pilot in the aircraft before take-off, as illustrated by the following example:

A McDonald Douglas DC-10 Series 30 Airplane makes a daily nonstop flight from London to Dallas/-Fort Worth Airport. On this transatlantic flight the airplane operates at a maximum gross weight of 560,000 lbs., capable of carrying a maximum 243,000 lbs. of fuel, with a useful payload of approximately 120,000 lbs. This useful payload is comprised of freight, in-flight service items, checked baggage, large quantities of carry-on baggage (estimated 25 lbs./person), up to 290 passengers and 10 members on the flight crew (estimated 180 lbs./person). The weight of the carry-on baggage, passengers and crew are estimated under existing airline policies and practices. On this DC-10, with a maximum passenger load, this estimated weight could be as much as 51.3% of this airplanes useful payload.

One might conclude that this practice of estimating the airplane weight is completely acceptable, until you consider the 78 lives lost on the Air Florida flight #90, which crashed Jan. 13, 1982 attempting to take-off from Washington National Airport in Washington, D.C. It was subsequently determined by the National Safety and Transportation Board, that the crash was due to the airplane being overweight; overweight due to snow and ice accumulations on the exterior of the airplane. Utilizing the weight and center of gravity system of the present invention which indicates the actual airplane weight and changes of center of gravity, whether forward or aft, could have alerted the pilots that their airplane was loaded beyond its certified limits and could have possibly saved lives.

When airplanes, such as the Continental Airlines flight #1713, which crashed Nov. 15, 1987 attempting take-off from the Denver Stapleton Airport, are servicing an airport with a high level of snowfall they are regularly delayed and can accumulate additional weight from snow and ice deposit on their wings and fuselages. A minor increase shown on the gross weight indicator of the present invention could alert the pilots that ice and snow deposits are accumulating, which can dislodge during flight and strike the aft engines, causing damage or even failure; justifying a pre-take-off trip back to the gate for deicing.

Fuel costs are a major concern to the airline industry. Frequently airplanes are held at the gate prior to departure, waiting for estimated weight and center of gravity calculations to be determined and transmitted from the ground computers to the pilots. Often those figures are delayed or if they come back beyond the airplanes limits, adjustments must be made at the gate. This new system progressively calculates those figures as the airplane is being loaded, giving those total figures to the pilots as the airplane doors are being closed. This being a real time measurement would allow the airplane to immediately leave the gate, thus saving fuel industry wide.

This invention relates to improvements to the previous so-called "Weight and Center of Gravity Indicators". The previous systems, use transducers of the strain gauge variety utilizing simple analog signals to transmit pressure readings for their calculations. The lack of those systems being utilized by the major air carriers, reinforces the position that those systems are not accurate nor reliable on today's more modern aircraft landing gear.

Today's aircraft landing gear struts incorporate the shock absorbing technique of forcing hydraulic fluid through a small orifice hole within the strut cylinder. Compressed nitrogen gas is used to retard foaming of the hydraulic fluid as it passes through this orifice. Changes in temperature effect the compressed nitrogen gas; as temperature increases within the strut the nitrogen gas increases in pressure, unless the landing gear strut extends to allow the increased pressure to dissipate. Multiple O-ring seals around the piston are used to retain the hydraulic fluid and compressed nitrogen gas contained within each strut cylinder. The retention of the compressed nitrogen gas and hydraulic fluid by the O-ring seals is due to the extreme amount of friction these seals maintain as they move up and down the interior strut cylinder walls. This friction causes substantial drag to this up and down movement. While this may improve the shock absorbing quality of the strut, IT DISTORTS INTERNAL PRESSURES WITHIN THE LANDING GEAR STRUT AS THOSE PRESSURES RELATE TO THE AMOUNT OF WEIGHT THE STRUT IS SUPPORTING. Temperature and hysteresis compensation factors are needed to correct for the false pressure readings caused by drag within the landing gear struts. The extreme accuracy of this new invention can be illustrated by the following example:

A McDonald Douglas DC-10 Series 30 Airplane has a maximum gross weight of 560,000 lbs. The port main landing gear strut supports a maximum of 252,000 lbs. with an internal strut pressure of 2300 psi. Proportionally each psi corresponds to 109.57 lbs. of weight supported. Utilizing Paroscientific, Inc. "Digiquartz ® Intelligent Transmitter" Series 1000 Model 1003K, with an accuracy to 0.3 psi, along with temperature and hysteresis adjustments, will allow calculations of the weight in increments as close as 32.87 lbs., to this strut supporting 45% of aircraft weight, with total gross weight to be calculated to increments as close as 73.04 lbs. on this ½ million pound aircraft, which provides an accurate measurement within 0.013%.

The airline industry may not wish to give up the methods for estimating weights, that they have been using for years. This new system could then complement their current practices by giving the pilots a verification, of data received from the ground computers, that one or more of the input figures to the ground computer, were not entered in error or possibly that some numbers have not been transposed. The decision whether or not to attempt a take-off, ultimately is made by the pilot in command. This new system will give more accurate information, which can be used to make that decision.

Cost effectiveness is another major concern of the airline companies; getting the most revenue from each flight that an airplane makes. With the current system of estimating weight, the airline companies must factor in margins for error in their calculations, which can result in unnecessary empty seats or less cargo transported. This new system which more accurately determines the airplane weight, could reduce those margin amounts, and allow more income producing cargo to be transported on each flight.

Still another application of this new system could be the general aviation industry (the private and corporate pilots). These pilots do not have the sophisticated weight and balance computers, used by the airline companies, at their disposal. These pilots must weigh each and every item loaded on to their airplanes, or as many pilots do, just estimate or guess at it. This new system will do for these pilots those benefits discussed for the airline pilots. Many private airplane crashes can possibly be avoided by giving the private and corporate pilots better information as to the weight and balance of their airplanes. The ultimate results can be more lives saved.

SUMMARY OF THE INVENTION

It is one object of the present invention to provide a new and improved airplane weight and center of gravity indicator which utilizes pressurized landing gear struts containing nitrogen gas. These struts maintain pressure by O-ring seal friction along interior strut cylinder walls. The weight supported by each strut is proportional to the amount of pressure contained within the strut. Distortion of these pressure readings occur from temperature changes and its effects on compressed nitrogen gas, along with the drag caused by O-ring seal friction. This invention provides more accurate measurements and calculations by using digital quartz pressure transmitters. A new software correction program is also incorporated utilizing digital temperature transducers to measure current temperatures within each landing gear strut, make compensations to the pressure readings, which adjust for the distortions incurred by O-ring seal drag and hysteresis.

Another object of this invention is to provide a new and improved airplane weight and center of gravity indicator which performs a unique daily self-check verification of the pressure transmitters, temperature transducers, and the onboard micro-computer with slave controllers, for failures or false measurements. Each day when the airplane is removed from service and standing at rest, the invention is turned off. Temperature and hysteresis corrected pressure readings, as they relate to the weight they are supporting, are stored within the computer memory. The next day, as the airplane is brought back into service, while the airplane is still at rest, the invention is turned back on displaying both the previous calculations as they compare to current calculations. The matching of these totals insure the repeatability and reliability of the new invention.

Yet another object of this invention is the provision of a new and improved onboard weight and center of gravity indicator which includes (optional) electronically controlled hydraulic fluid/compressed gas valves which will only be open while the micro-computer/controller makes a sequence of pressure and temperature measurements. The purpose of these valves are to protect the pressure transmitters, and to provide a safety measure against strut pressure loss in the event of a pressure transmitter failure or burst.

One other object of this invention is to provide a unique "Hard Landing Indicator" system utilizing preprogrammed pressure limits stored in the computer memory which will illuminate a warning signal on the cockpit display, when those pressure limits are exceeded during a hard landing.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

DETAILED DESCRIPTION OF THE PREFERRED EMBODIMENT

Figure 1:
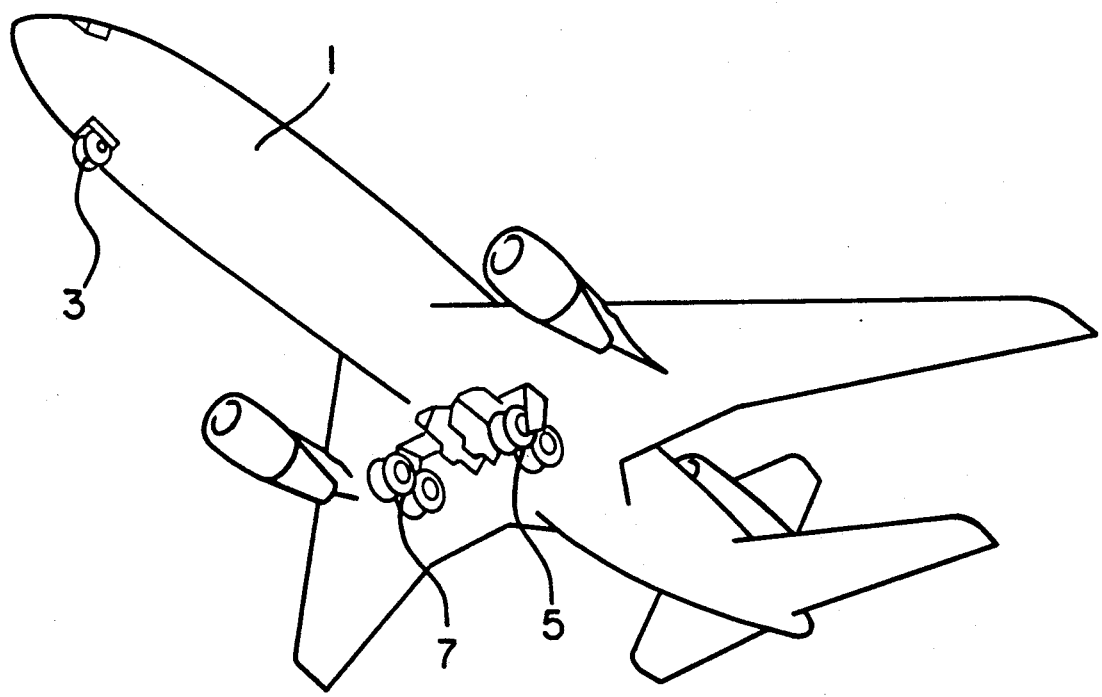
FIG. 1 is a view of the lower side of a typical commercial airliner with a tricycle type landing gear, in the extended position.

Referring now to the drawings, wherein like reference numerals designate corresponding parts throughout the several views and more particularly to FIG. 1 thereof, is a typical commercial airliner 1 with a tricycle landing gear configuration consisting of a nose landing gear 3, port main landing gear 5 and starboard main landing gear 7.

Figure 2:
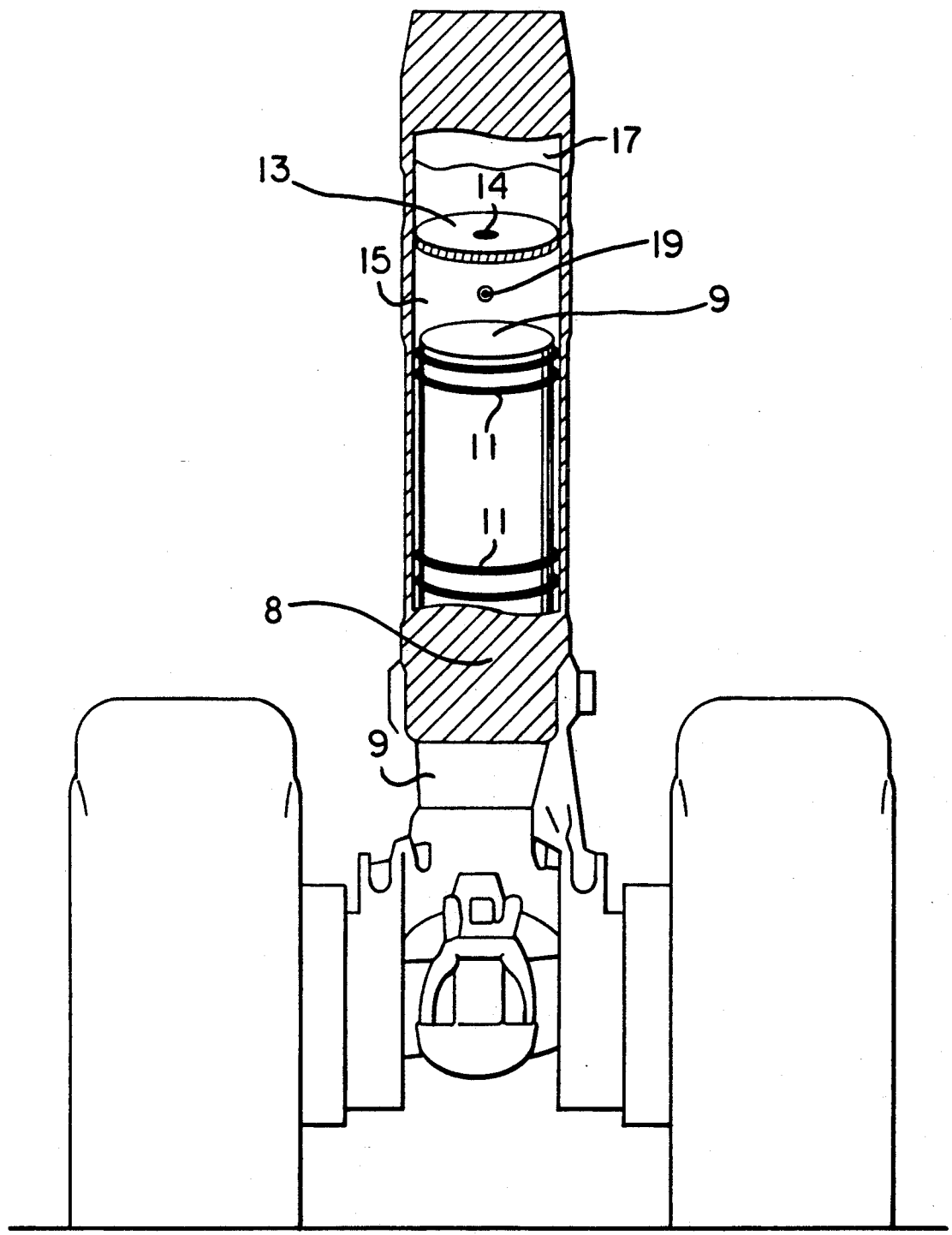
FIG. 2 is a partial cross-sectional front view of a typical commercial airliner landing gear shock strut, with enclosed piston, O-ring seals and orifice plate.

Referring now to FIG. 2, wherein each landing gear which are always exposed to extreme temperature, whether extended or retracted, consists of one oleo-type shock strut 8, of which together support the weight of the airplane on a nitrogen gas and hydraulic fluid cushion, which also absorb landing shock. Internally each shock strut contains a forged steel piston 9, with an orifice plate 13 containing an orifice hole 14 that dampens the strut compression motion. O-ring seals 11 serve to retain the hydraulic fluid 15 and compressed nitrogen gas 17 inside the strut cylinder. The landing gear struts 8 can be pressurized externally through the pressurization valve fitting 19.

Figure 3:
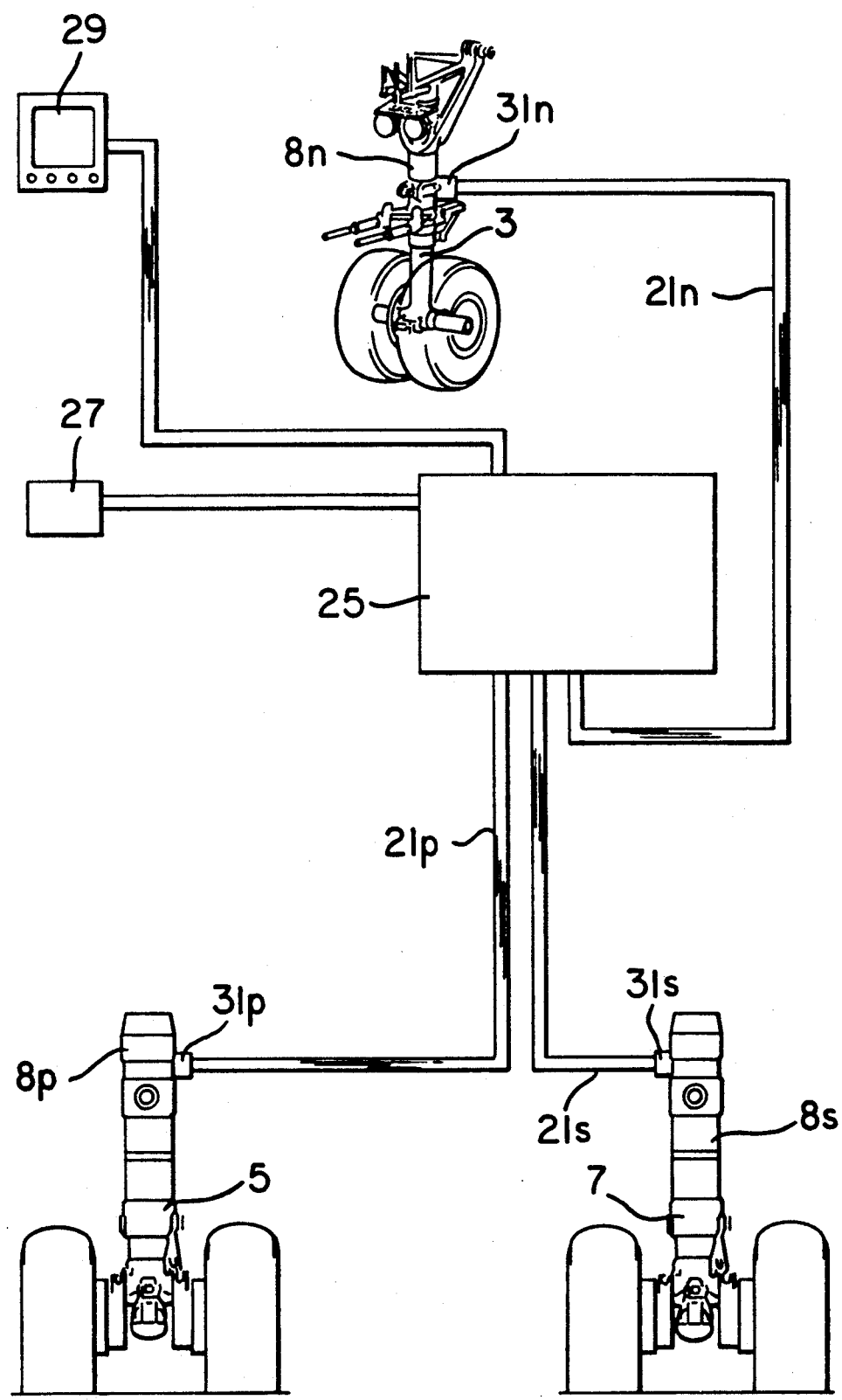
FIG. 3 is a schematic view of the invention in accordance with a preferred embodiment.

Referring now to FIG. 3, which is a schematic of the invention illustrating its connecting components, in which p represents those components of the invention dedicated to the port landing gear, n represents those components of the invention dedicated to the nose landing gear, and s represents those components of the invention dedicated to the starboard landing gear. Nose landing gear 3, along with port main landing gear 5 and starboard main landing gear 7 support the weight of the airplane on a cushion of hydraulic fluid and compressed nitrogen gas 17 (FIG. 2). Internal strut temperature and pressure signals from each of the weight supporting landing gears are transmitted by highly accurate digital and quartz pressure and temperature transducer assemblies 31n, 31p, 31s via wiring harnesses 21n, 21p, 21s to an onboard micro-computer/controller 25. The system is powered by an existing power source 27 onboard the airplane. Various calculations and information are transmitted to an airplane cockpit display 29.

Figure 4:
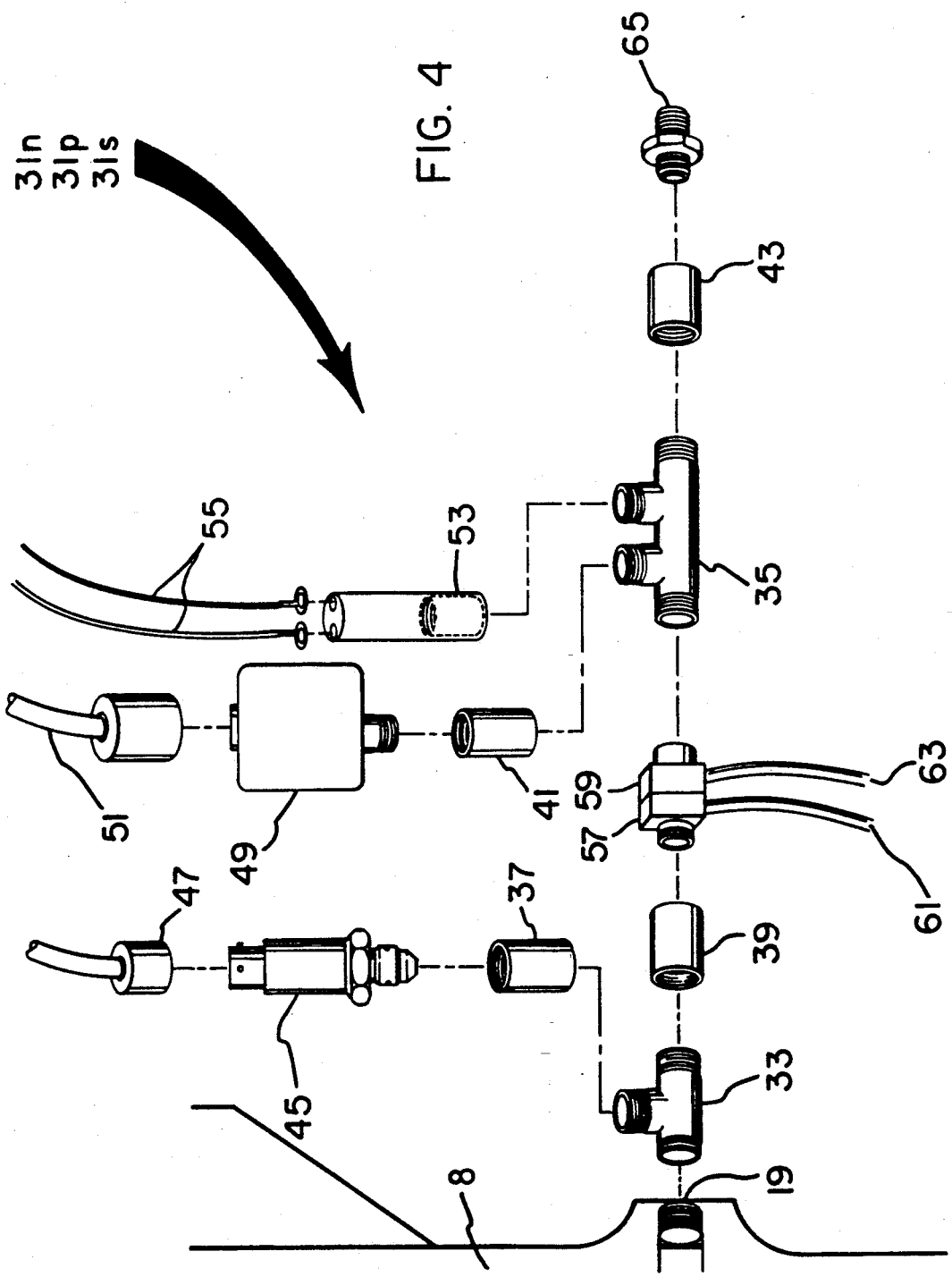
FIG. 4 is an exploded pictorial diagram of a typical commercial airline landing gear shock strut, with attached components of the invention.

Referring now to FIG. 4, which is a detailed view of the embodiment of transducer assemblies 31n, 31p, 31s of FIG. 3, wherein a typical commercial airliner, landing gear strut 8 incorporates a conventional pressurization valve 65 attached to each strut through a pressurization valve fitting 19. The pressurization valve 65 is removed to facilitate the installation of a primary T-fitting 33 on which is attached a high pressure transducer 45 connected by a threaded coupler 37. The high pressure transducer 45 is used to register any extreme pressure experienced during the initial compression of the shock strut 8 during the landing of the airplane. In-line electronic valves 57, 59 are connected to the primary T-fitting 33 by another threaded coupler 39. These valves 57, 59 will receive closing signals via wiring harnesses 61, 63 from the onboard micro-computer/controller, after sufficient pressure and temperature readings are received to make all requested calculations. This insures that the more delicate measuring equipment is protected from the extreme pressures experienced during the landing of the large airliners. A double T-fitting 35 is attached to the electronic valve 59 facilitating the connection of a pressure transmitter 49 by another threaded coupler 41. The pressure transmitter in the preferred embodiment is a "Digiquartz ® Intelligent Transmitter" Series 1000 Model 1003K. Transmitter models vary to the pressure limits on various strut assemblies. A typical −30° F. through 120° F. range temperature transducer 53 is also attached to double T-fitting 35. A fourth threaded coupler 43 is attached to double T-fitting 35 to facilitate the re-installation of the pressurization valve 65. High pressure signals are sent to the micro-computer/controller via wiring harness 47. Sustained airplane weight pressure signals are sent to the micro-computer/controller via wiring harness 51 with corresponding temperature signals sent via wiring harness 55.

Figure 5:
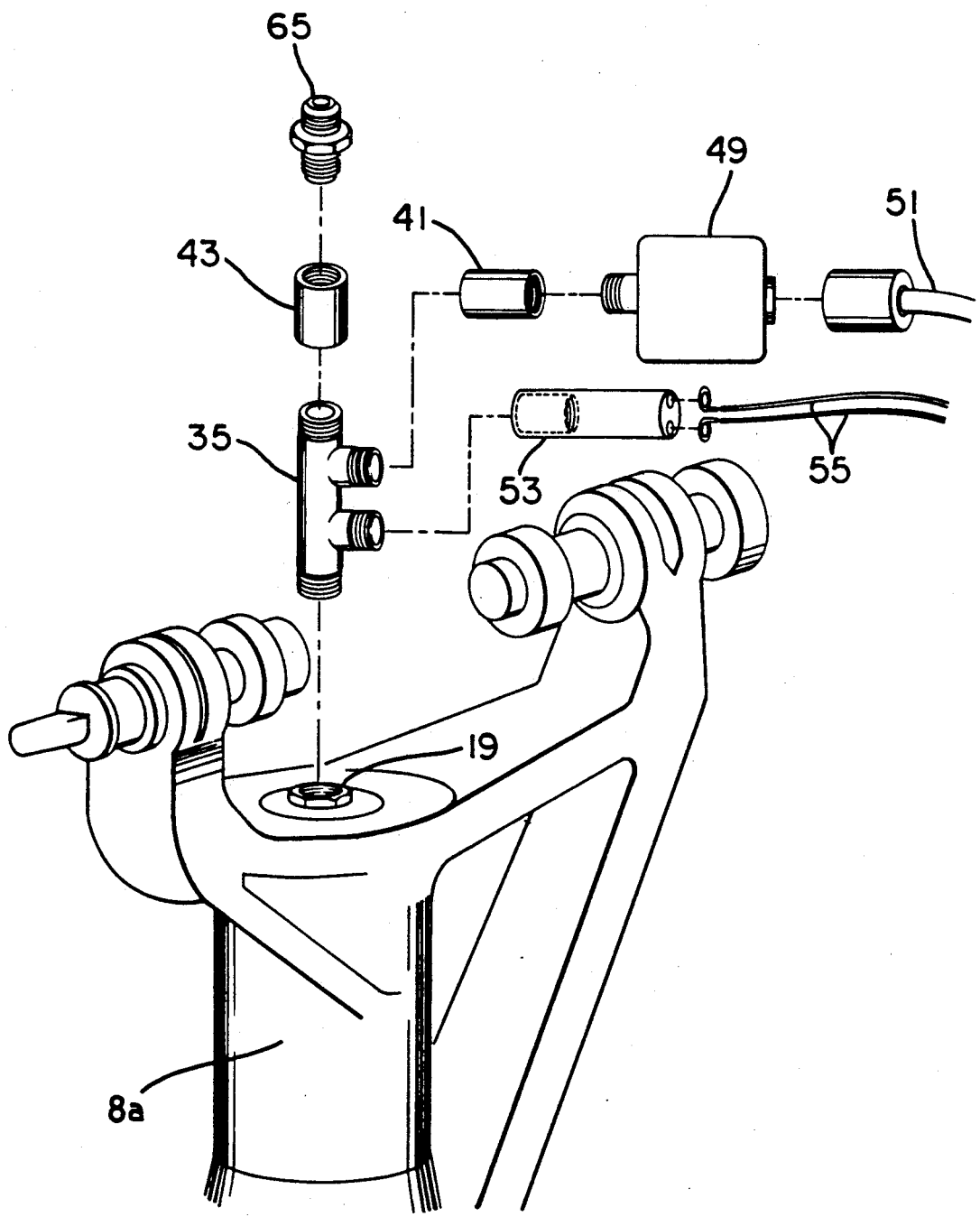
FIG. 5 is an exploded pictorial diagram of a typical general aviation airplane landing gear shock strut, with attached components of the invention.

Referring now to FIG. 5, which is a typical general aviation (small airplane) landing gear strut 8a which incorporates a pressurization valve 65 attached to each strut through a pressurization fitting 19. The pressurization valve 65 is removed to facilitate the installation of a double T-fitting 35. A pressure transmitter 49 which is connected to a threaded coupler 41, along with a typical −30° F. through 120° F. range temperature transducer 53, are attached to the double T-fitting 35. The pressure transmitter in the preferred embodiment is a "Digiquartz ® Intelligent Transmitter" Series 1000 Model 1003K. Transmitter models vary to the pressure limits on various strut assemblies. A second coupler 43 is used to facilitate the reinstallation of the pressurization valve 65. The relatively lower pressures experienced by the general aviation landing gear struts allow for the elimination of the in-line electronic valves. The need for a high pressure transducer is also eliminated due to these lower pressure readings. Hard landing pressures can be sustained, measured and transmitted by the pressure transmitter 49. Strut pressure signals relative to the weight of the airplane are sent to the micro-computer/controller via wiring harness 51 with corresponding temperature signals sent via wiring harness 55.

Figure 6:
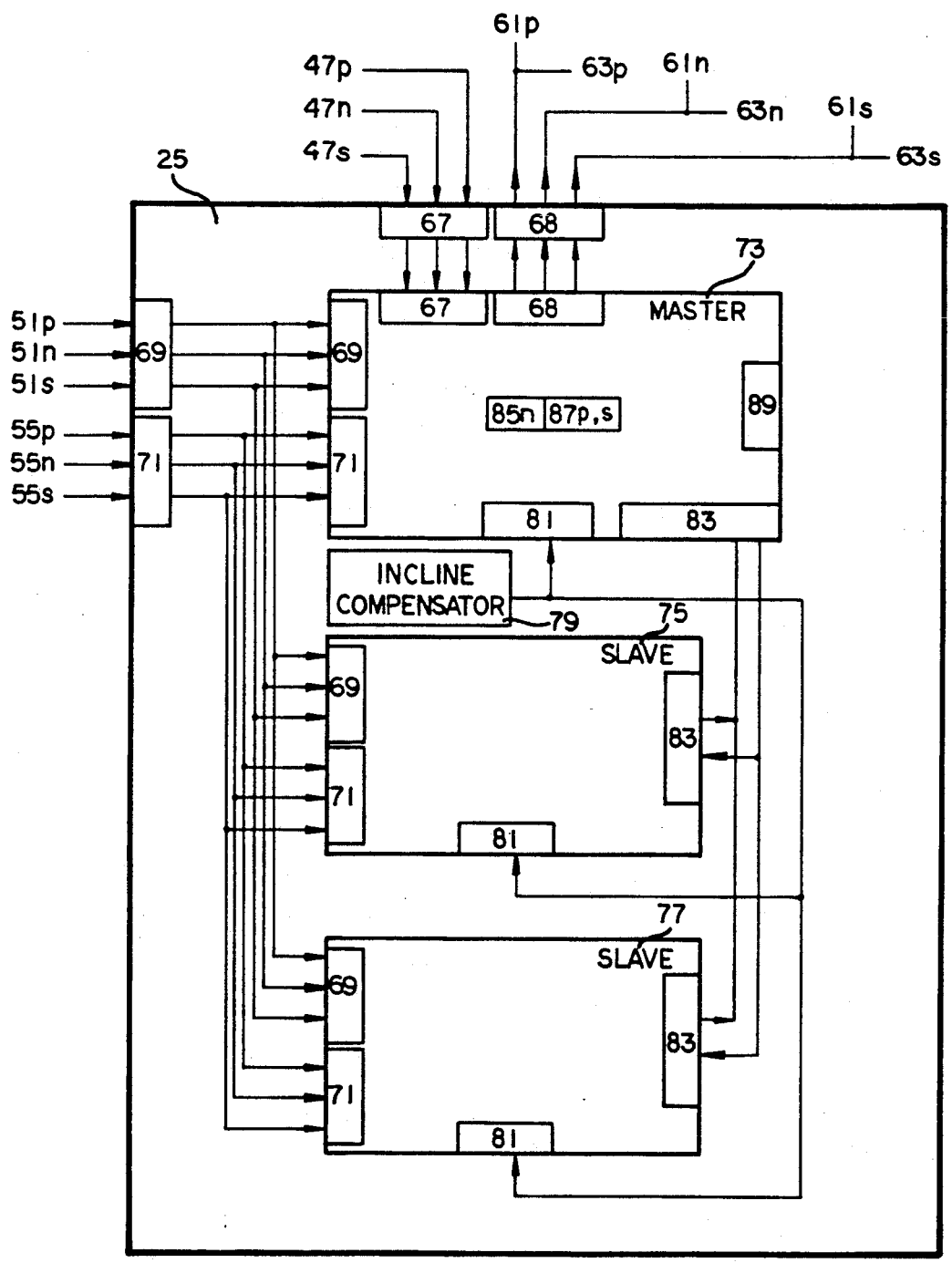
FIG. 6 is a schematic of the onboard micro-computer, with slave controllers, of the invention.

Referring now to FIG. 6, wherein p represents those components of the invention dedicated to the port landing gear, n represents those components of the invention dedicated to the nose landing gear, and s represents those components of the invention dedicated to the starboard landing gear. Temperature input signals via the nose wiring harness lead 55n, port wiring harness lead 55p and starboard wiring harness lead 55s are transmitted to the strut temperature sensor inputs 71; sustained pressure input signals via the nose wiring harness lead 51n, port wiring harness lead 51p and starboard wiring harness lead 51s are transmitted to the strut pressure sensor inputs 69, of a typical micro-computer/controller 25 system utilizing a master micro-controller 73 and two slave micro-controllers 75, 77 for triple redundancy. In this configuration each of the micro-controllers 73, 75, 77 receive duplicate pressure and temperature information from nose 55n, 51n port 55p, 51p and starboard 55s, 51s leads. Each of the three micro-controllers 73, 75, 77 also receives duplicate information from the incline compensator 79. In this configuration each of the three micro-controllers 73, 75, 77 perform parallel calculations. The calculations for gross weight, % MAC, strut temperature compensation, strut drag and incline compensation 81 are performed by each micro-controller in the system and transmitted via the master/slave communication port 83 to the master micro-controller 73.

To determine the gross weight of an airplane, with a tricycle landing gear configuration, the following equation must be solved:

$$W_{nt} + W_{pt} + W_{st} = W_t$$

where:
$W_{nt}$ is the weight supported by the nose landing gear,
$W_{pt}$ is the weight supported by the port landing gear,
$W_{st}$ is the weight supported by the starboard landing gear, and
$W_t$ is the total weight of the airplane.

To determine the values of $W_{nt}$, $W_{pt}$ and $W_{st}$ the following equations must be solved:

$$SA_n \times \text{psi} = W_{nt}$$

$$SA_p \times \text{psi} = W_{pt}$$

$$SA_s \times \text{psi} = W_{st}$$

where:
$SA_n$ is the load supporting Surface Area within the nose landing gear strut,
$SA_p$ is the load supporting Surface Area within the port landing gear strut,
$SA_s$ is the load supporting Surface Area within the starboard landing gear and psi is the amount of pressure currently contained within each corresponding landing gear strut, measured in pounds per square inch.

In the calibration process for the preferred embodiment of this new invention, after it has been installed on a typical commercial airliner, said airplane is rolled on to a set of three calibration scales; currently used by the airline industry, when they periodically check each airplane for weight changes. The empty weight of the airplane is recorded by the sum and totaling of the weights registered by the three calibration scales. The weight reading taken from each scale is divided by the current pressure reading, as sensed by pressure transmitter 49 (FIG. 4), in pounds per square inch (psi), of the corresponding landing gear strut. The total number of pounds supported by the landing gear strut, divided by the psi reading, equals the load supporting surface area (SA) measured in square inches, of that landing gear strut cylinder. To verify this SA value, weight is loaded on to the airplane. This weight is commonly in the form of jet fuel, which can be either pumped into or out of the fuel tanks. After the increased weight of the airplane has been recorded, the amount of the increased weight, divided by the increased psi reading of the strut is used to again determine the value for SA. The previous and current values for SA should match within a pre-determined level of tolerance. This procedure is repeated for at least five different weight readings for each landing gear strut. To insure the level of accuracy of this new invention, adjustments are made for drag within each landing gear strut.

To determine the value for drag on a particular landing gear strut, the following equations must be solved:

$$W_{t1} \div psi_1 = SA_1$$

$$W_{t2} \div psi_2 = SA_2$$

$$(W_{t1} \div SA_2) - (W_{t1} \div SA_1) = d$$

where:

$W_{t1}$ is the initial weight supported by a particular landing gear strut.

$W_{t2}$ is the amount of an increased weight added to that particular landing gear strut.

$psi_1$ is the internal strut pressure, measured in pounds per square inch, generated from the application of $W_{t1}$ $psi_2$ is the increased amount of internal strut pressure, measured in pounds per square inch, generated from the addition of $W_{t2}$.

$SA_1$ is a value representing the load supporting Surface Area, within the landing gear strut cylinder, distorted by drag.

$SA_2$ is the true load supporting Surface Area, within the landing gear strut. and d is the drag, measured in pounds per square inch.

This completes the calibration of the new invention at a constant temperature. The present invention provides for temperature measurements and adjustments to the landing gear strut pressure readings to compensate for effect of changes in temperature on drag. To develop this drag adjustment program within the computer, a "drag to temperature" adjustment curve, commonly called a "look-up table", is charted by recording various airplane weights, while the airplane is on the afore mentioned calibration scales, and comparing those weights to the corresponding pressure readings of the new invention; through a wide range of temperatures, as sensed by the temperature transducer 53 (FIG. 4). These temperature changes are artificially introduced to the landing gear struts, for this process. The "drag to temperature" look-up table is stored into the memory of each micro-controller 73, 75, 77 for future use to recall pressure adjustment values corresponding to drag caused by a variety of temperatures experienced by that particular airplane.

The varying location of an airplane's center of gravity is described as a percentage of the Mean Aerodynamic Chord (% MAC).

To determine % MAC on an airplane the following equation must be solved:

$$\frac{y}{MAC} = \frac{L}{MAC}\left(1 - \frac{l}{L}\right)\frac{L}{MAC}\left(\frac{W_{nt}}{W_t}\right)$$

where:

L is the distance between the nose landing gear and the port and starboard landing gears, l is the distance of the nose landing gear from the leading edge of the Mean Aerodynamic Chord, MAC is the length of the Mean Aerodynamic Chord, $$\% MAC \text{ is } \frac{y}{MAC} \times 100$$

$W_t$ is the total weight of the airplane, $W_{nt}$ is the weight supported by the nose landing gear and y is the distance between the leading edge of the Mean Aerodynamic Chord and the center of gravity of the airplane.

Irregardless of the loading configuration of a particular airplane L, l and MAC are known constants; $W_t$ and $W_{nt}$ are values provided through the solution to the equation to determine the total gross weight of the airplane.

When these calculations are complete, and the master micro-controller 73 has received the parallel calculation results from the slave micro-controllers 75, 77, a confidence calculation 89 is performed by the master micro-controller 73.

In the preferred embodiment, the determination of the confidence factor will call for a standard deviation to be determined between all of the micro-controller 73,75,77 solutions to the equations for gross weight and % MAC. On a scale from 10 to 100, a 1% standard deviation is equal to a confidence factor of 10, and a 0% standard deviation is equal to a confidence factor of 100.

The results of the calculations for gross weight, % MAC and confidence are transmitted to the cockpit display 29 (FIG. 3). After the master micro-controller 73 has made all transmissions to the cockpit display 29 (FIG. 3), valve closing signals are sent through outputs 68, via wiring harnesses 61n 63n, 61p 63p, 61s 63s, to their corresponding electronic valves 57 59 (FIG. 4). A "Hard Landing" can be determined during the initial impact of the airplane landing. The extreme strut pressure signals generated from transducers 45 (FIG. 4) are transmitted to pressure sensor inputs 67 via wiring harnesses 47n, 47p, 47s. These pressures are compared to preprogrammed limits 85n, 87p,s which are provided by the airplane and landing gear strut manufacturers, then stored within the master micro-controller 73. If any of these preprogrammed limits 85n, 87p,s are exceeded, a signal representing the corresponding landing gear will be transmitted to the cockpit display 29 (FIG. 3), advising the pilot that a hard landing has possibly effected a particular landing gear. In the preferred embodiment, an optional security device such as a maintenance pass-key will be required to remove the "Hard Landing" indication from the cockpit display 29 (FIG. 3).

At the end of each day, when the airplane is retired from service and onboard instrumentation is shut down, this system preforms one final calculation to determine weight and center of gravity. The following day as the airplane is brought back into service, and onboard instrumentation is turned back on, this system again performs the calculations to determine weight and center of gravity; then compares these new calculations to those of the previous day. A match will provide a self-check to the entire system.

In a practical application of the preferred embodiment of this new invention, the micro-computer/controller 25 will perform the following tasks:

a. Take pressure and temperature readings from each landing gear strut.
b. Refer to the look-up table for each strut stored in the computer memory, to determine a drag value as it relates to current temperature signals received from temperature transducer 53 (FIG. 4).
c. Make the appropriate adjustments for drag to the current pressure readings.

This will result in an adjusted pressure value which can be used to determine the actual weight supported by each landing gear strut and make final calculations to determine the weight and center of gravity of the airplane.

Although an exemplary embodiment of the invention has been disclosed and discussed, it will be understood that other applications of the invention are possible and that the embodiment disclosed may be subject to various changes, modifications, and substitutions without necessarily departing from the spirit of the invention.

What is claimed is:

1. An apparatus for determining the weight of an aircraft, said aircraft comprising plural landing gear struts, said struts experiencing drag, such as strut seal friction, said apparatus comprising:
    a) a pressure sensor for each aircraft landing gear strut, said pressure sensors being adapted to couple to said struts so as to measure pressure inside of said respective strut;
    b) a temperature sensor for each aircraft landing gear strut, said temperature sensors being adapted to couple to said struts so as to measure the temperature of said respective strut;
    c) processor means for determining said aircraft weight, said processor means being connected to said pressure sensors and said temperature sensors, said processor means determining said aircraft weight using temperature measurements obtained from said temperature sensors to retrieve an appropriate, stored pressure adjustment to compensate and adjust each existing landing gear strut pressure, obtained from said respective pressure sensors which is distorted by said drag, as it relates to the weight said strut is supporting,
    d) means for providing said determined aircraft weight to a human, said means being coupled to said processor means.

2. The apparatus of claim 1, wherein said pressure sensors comprise a digital quartz pressure sensor.

3. The apparatus of claim 1, wherein each of said respective temperature sensors and pressure sensors for each of said aircraft landing gear struts are coupled to said strut at an existing strut fitting.

4. The apparatus of claim 1, further comprising a protective shut-off valve means located on each aircraft strut, each of said protective valve means being selectively opened and closed, each of said protective valve means being adapted to selectively isolate said respective temperature sensor and said pressure sensor from pressure in said landing gear strut during the impact of the aircraft landing, and as means to protect the aircraft in the event of said temperature sensor or said pressure sensor leaking or bursting, each of said protective valve means being connected to said processor means, wherein said processor means controls the opening and closing of said protective shut-off valves.

5. The apparatus of claim 4, wherein each of said protective shut-off valve means automatically closes if said processor means fails.

6. The apparatus of claim 1, wherein said processor means comprises a master processor and a backup slave processor to provide redundancy.

7. A method of determining the weight of an aircraft, said aircraft being supported by plural landing gear struts, said struts experiencing drag, such as strut seal friction, said method comprising the steps of:
    a) determining the internal pressure in each landing gear strut;
    b) determining the temperature of each landing gear strut;
    c) using said strut temperature to determine an appropriate temperature-to-drag pressure adjustment, on each landing gear strut;
    d) determining the weight supported by each landing gear strut, using said respective adjusted pressure;
    e) determining the total weight of said aircraft by summing said weights supported by all of said landing gear struts.

8. The method of claim 7, further comprising the step of determining the center of gravity of said aircraft in terms of percent Mean Aerodynamic Chord (%MAC) using said respective adjusted pressures.

9. The method of claim 7, further comprising the step of performing a self-check of said weight determination by comparing current weight determinations to previous weight determinations, obtained under identical weight and inclination conditions.

10. The method of claim 7, further comprising the step of storing said weight, pressure and temperature determinations so as to create a history of weight, pressure and temperature determinations for each landing gear strut, and using said respective histories to evaluate the performance of each strut.

11. The method of claim 7, further comprising the steps of:
    a) making said weight and temperature determinations with plural processor means, such that a first processor means determines the total weight of said aircraft and a second processor means determines the total weight of said aircraft, and then;
    b) comparing the first processor means total weight and the second processor means total weight to determine a confidence factor which indicates the reliability of said total weight determinations.

12. The method of claim 7, further comprising the steps of:

a) measuring said internal pressure in each landing gear strut during a landing of said aircraft;

b) comparing said measured pressures to predetermined pressures, wherein if measured pressures exceed said predetermined pressures then said aircraft has experienced a hard landing;

c) if said aircraft has experienced a hard landing, then providing an indication of said hard landing.

13. The method of claim 12, further comprising the step of preventing said indication of said hard landing from being deleted without an appropriate passkey.

* * * * *